US011505692B2

(12) United States Patent
Ota et al.

(10) Patent No.: US 11,505,692 B2
(45) Date of Patent: Nov. 22, 2022

(54) (METH) ACRYLIC RESIN COMPOSITION AND ELECTROCONDUCTIVE ADHESIVE USING THE SAME

(71) Applicant: THREEBOND CO., LTD., Tokyo (JP)

(72) Inventors: Soichi Ota, Tokyo (JP); Yusuke Kuwahara, Tokyo (JP); Hitoshi Mafune, Tokyo (JP); Tomoya Kodama, Tokyo (JP); Makoto Kato, Tokyo (JP); Masayuki Osada, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 0 days.

(21) Appl. No.: 16/328,409

(22) PCT Filed: Aug. 24, 2017

(86) PCT No.: PCT/JP2017/030394
§ 371 (c)(1),
(2) Date: Feb. 26, 2019

(87) PCT Pub. No.: WO2018/043296
PCT Pub. Date: Mar. 8, 2018

(65) Prior Publication Data
US 2019/0194443 A1    Jun. 27, 2019

(30) Foreign Application Priority Data
Sep. 2, 2016 (JP) .............. JP2016-172136

(51) Int. Cl.
C08L 33/10 (2006.01)
C09J 9/02 (2006.01)
C08F 4/34 (2006.01)
H01B 1/22 (2006.01)
C08F 290/06 (2006.01)
C08L 51/00 (2006.01)
C08F 220/36 (2006.01)
C09J 151/08 (2006.01)
C08F 2/44 (2006.01)
C09J 11/04 (2006.01)
C09J 11/06 (2006.01)
C08F 20/28 (2006.01)
C08K 3/08 (2006.01)
C08K 5/14 (2006.01)
C08K 9/04 (2006.01)
C09J 133/10 (2006.01)
C08K 5/09 (2006.01)

(52) U.S. Cl.
CPC .............. C08L 33/10 (2013.01); C08F 2/44 (2013.01); C08F 4/34 (2013.01); C08F 20/28 (2013.01); C08F 220/36 (2013.01); C08F 290/06 (2013.01); C08F 290/067 (2013.01); C08K 3/08 (2013.01); C08K 5/14 (2013.01); C08K 9/04 (2013.01); C08L 51/00 (2013.01); C09J 9/02 (2013.01); C09J 11/04 (2013.01); C09J 11/06 (2013.01); C09J 133/10 (2013.01); C09J 151/08 (2013.01); H01B 1/22 (2013.01); C08K 5/09 (2013.01); C08K 2003/0806 (2013.01); C08K 2201/001 (2013.01); C08K 2201/003 (2013.01); C08K 2201/005 (2013.01); C08K 2201/006 (2013.01)

(58) Field of Classification Search
None
See application file for complete search history.

(56) References Cited

U.S. PATENT DOCUMENTS

| | | | |
|---|---|---|---|
| 2006/0081820 A1 | 4/2006 | Li et al. | |
| 2006/0289837 A1* | 12/2006 | McNeilly | C10M 105/26 252/500 |
| 2008/0116416 A1* | 5/2008 | Chacko | H01G 9/012 252/62.2 |
| 2010/0247940 A1 | 9/2010 | Takahashi et al. | |
| 2012/0080068 A1* | 4/2012 | Bae | C09J 133/14 136/244 |
| 2013/0119563 A1* | 5/2013 | Park | C09J 9/02 257/787 |
| 2014/0318709 A1 | 10/2014 | Sato et al. | |
| 2015/0255633 A1* | 9/2015 | Sukata | C09J 163/00 136/256 |
| 2015/0344749 A1* | 12/2015 | Ochi | C09J 9/02 252/75 |

FOREIGN PATENT DOCUMENTS

| | | |
|---|---|---|
| CN | 105814093 A | 7/2016 |
| JP | 2000-53733 A | 2/2000 |
| JP | 2004-43608 A | 2/2004 |
| JP | 2004-189954 A | 7/2004 |
| JP | 2007-169522 A | 7/2007 |
| JP | 2007-262243 A | 10/2007 |
| JP | 2009-209246 A | 9/2009 |
| JP | 2012-46658 A | 3/2012 |
| JP | 2014-112224 A | 6/2014 |
| JP | 2015-135805 A | 7/2015 |
| WO | 2013/089061 A1 | 6/2013 |

OTHER PUBLICATIONS

Chinese Office Action dated Nov. 9, 2020, in connection with corresponding CN Application No. 201780051879.4 (12 pp., including machine-generated English translation).

(Continued)

Primary Examiner — Katie L. Hammer
(74) Attorney, Agent, or Firm — Maier & Maier, PLLC

(57) ABSTRACT

In the (meth)acrylic resin composition of the present invention, when a sealed container is used, it is possible to achieve both storage stability in an atmosphere at 25° C. and low temperature curability in an atmosphere at 60 to 140° C., and further, properties thereof can be exhibited even in an electroconductive adhesive including electroconductive particles. The present invention is a (meth)acrylic resin composition including the following components (A) to (C): component (A): a urethane modified oligomer having a (meth)acrylic group, component (B): a monomer having a hydroxyl group and/or a carboxylic group and one (meth) acrylic group in a molecule in which a surface tension is 25 to 45 mN/m, and component (C): an organic peroxide having a specific structure.

8 Claims, No Drawings

(56) References Cited

OTHER PUBLICATIONS

Chinese Office Action dated Jun. 15, 2021, in connection with corresponding CN Application No. 201780051879.4 (12 pp., including machine-generated English translation).
Japanese Office Action dated Jul. 27, 2021, in connection with corresponding JP Application No. 2018-537207 (8 pp., including machine-generated English translation).
Decision of Refusal dated Nov. 12, 2021, in connection with corresponding Chinese Application No. 201780051879.4 (12 pp., including machine-generated English translation).
Office Action dated Apr. 20, 2022 in Korea Patent Application No. 10-2019-7004236 (with English translation); 12 pgs.
Korean Office Action dated Oct. 8, 2021, in connection with corresponding KR Application No. 10-2019-7004236 (10 pp., including machine-generated English translation).
Office Action dated Feb. 3, 2022 in Japanese Patent Application No. 2018-537207 (with English translation); 6 pgs.
Office Action dated Jan. 27, 2022 in Vietnamese Patent Application No. 1-2019-01027 (with English translation); 4 pgs.

\* cited by examiner

(METH) ACRYLIC RESIN COMPOSITION AND ELECTROCONDUCTIVE ADHESIVE USING THE SAME

FIELD

The present invention relates to a (meth)acrylic resin composition having thermocurability and an isotropic electroconductive adhesive using the same.

BACKGROUND

In a (meth)acrylic resin composition, it is known to use a stabilizer such as a polymerization inhibitor, or the like, as a method for maintaining storability. However, it is known that when the stabilizer is added excessively, curability is lowered, and in the worst case, the composition is not cured. Further, in the electroconductive adhesive as disclosed in JP 2000-53733 A, a large amount of electroconductive particles such as silver powder, and the like, is included, and thus gelation tends to occur since metal ions affect peroxide. In particular, when the electroconductive adhesive is stored in a container having no air permeability, there is a problem in that gelation occurs. In radical polymerization of the (meth) acrylic resin composition, it is generally possible to impart photocurability, thermocurability, and anaerobic curability by changing the type of curing agent. Therefore, it is presumed that even if a (meth)acrylic resin composition imparted with thermocurability is designed, anaerobic curability potentially remains, and when the composition is stored in a container having no air permeability, the aerobic curability is exhibited, and thus gelation is accelerated.

SUMMARY

When the conventional (meth)acrylic resin composition is stored using a sealed container, it is difficult to achieve both storage stability in an atmosphere at 25° C. and low temperature curability in an atmosphere at 60 to 140° C. Further, in a electroconductive adhesive including a (meth)acrylic resin composition including conventional electroconductive particles, it is further difficult to achieve both storage stability and low temperature (60 to 140° C. atmosphere) curability.

As a result of intensive studies to achieve the above object, the present inventors found a technique relating to a (meth)acrylic resin composition and a electroconductive adhesive using the same and completed the present invention.

The gist of the present invention is described below. A first embodiment of the present invention is a (meth)acrylic resin composition including the following components (A) to (C):

component (A): a urethane modified oligomer having a (meth)acrylic group, component (B): a monomer having a hydroxyl group and/or a carboxylic group and one (meth)acrylic group in a molecule in which a surface tension is 25 to 45 mN/m, and component (C): an organic peroxide having a structure of Formula 1 to be described below.

A second embodiment of the present invention is the (meth)acrylic resin composition according to the first embodiment, wherein the component (B) has a surface tension of 33 to 45 mN/m.

A third embodiment of the present invention is the (meth)acrylic resin composition according to the first or second embodiment, wherein the composition does not include rubber, an elastomer, and a thermoplastic resin.

A fourth embodiment of the present invention is the (meth)acrylic resin composition according to any one of the first to third embodiments, wherein the component (C) is an organic peroxide having a structure of Formula 2 to be described below.

A fifth embodiment of the present invention is the (meth)acrylic resin composition according to any one of the first to fourth embodiments, wherein the component (B) is at least one kind selected from the group consisting of 2-hydroxyethyl (meth)acrylate, 2-hydroxybutyl (meth)acrylate, 4-hydroxybutyl (meth)acrylate, and 2-(meth)acryloyloxyethyl succinic acid.

A sixth embodiment of the present invention is the (meth)acrylic resin composition according to any one of the first to fifth embodiments, further including: electroconductive particles as a component (D).

A seventh embodiment of the present invention is the (meth)acrylic resin composition according to the sixth embodiment, wherein the component (D) is at least one kind of electroconductive particles selected from silver powder and silver-plated powder that are surface-treated with stearic acid.

A eighth embodiment of the present invention is a thermocurable electroconductive adhesive including: the (meth)acrylic resin according to the six or seventh embodiment.

DETAILED DESCRIPTION

The (meth)acrylic resin composition of the present invention is characterized by including: component (A): a urethane modified oligomer having a (meth)acrylic group, component (B): a monomer having a hydroxyl group and/or a carboxylic group and one (meth)acrylic group in a molecule in which a surface tension is 25 to 45 mN/m, and component (C): an organic peroxide having a structure of Formula 1 to be described below. By having this constitution, when the (meth)acrylic resin composition of the present invention is stored using a sealed container, it is possible to achieve both storage stability in an atmosphere at 25° C. and low temperature curability in an atmosphere at 60 to 140° C. Further, even in a case of a electroconductive adhesive including the (meth)acrylic resin composition of the present invention which includes electroconductive particles, properties thereof (that is, achievement of both storage stability in an atmosphere at 25° C. and low temperature curability in an atmosphere at 60 to 140° C.) can be exhibited.

Details of the (meth)acrylic resin composition of the present invention (hereinafter also simply referred to as "the composition of the present invention") are described below.

The component (A) that can be used in the present invention is a urethane modified oligomer having a (meth) acrylic group. As the component (A), it is known that the component is obtained by forming a urethane bond between a polyol and a polyisocyanate, and performing a synthesis of adding a compound having a hydroxyl group and a (meth) acrylic group or an acrylic acid to an unreacted isocyanate group, and the like. In addition, as the component (A) according to the present invention, commercially available products may also be used. Specific examples of the commercially available products of the component (A) may include AH-600, AT-600, UA-306H, UF-8001G manufactured by Kyoeisha Chemical Co., Ltd., and the like, Ebecryl 220 as Ebecryl series manufactured by Daicel-Allenex Ltd., and the like, but the commercially available products of the component (A) is not limited thereto.

The component (B) that can be used in the present invention is a monomer having a hydroxyl group and/or a carboxylic group and one (meth)acrylic group in a molecule in which a surface tension is 25 to 45 mN/m. When the surface tension of the component (B) according to the present invention is 25 to 45 mN/m, storage stability as the (meth)acrylic resin composition can be improved. In addition, from the viewpoint of further improving the storage stability, the surface tension is more preferably 33 to 45 mN/m. Here, in the component (B), it is preferable that a hydroxyl group and a carboxylic group are added to a hydrocarbon group. Even though there is no clear reason for this, it is presumed that compatibility between the surface tension of the component (B) and the component (C) which is an organic peroxide to be described below is involved.

Here, a method of measuring the surface tension may include a plate method, a ring method, a hanging drop method, and a maximum bubble pressure method, and the like. As a specific device, an automatic surface tensiometer YD-200 manufactured by Kyowa Interface Science Co., Ltd., and the like, may be included, but the device is not limited thereto.

As the component (B), 2-hydroxyethyl (meth)acrylate, 2-hydroxybutyl (meth)acrylate, 4-hydroxybutyl (meth)acrylate, 2-(meth)acryloyloxyethyl succinic acid, 2-hydroxypropyl (meth)acrylate, and the like, may be included, but the component (B) is not limited thereto. From the viewpoint of achievement of both storage stability and curability, the component (B) is preferably at least one kind selected from the group consisting of 2-hydroxyethyl (meth)acrylate, 2-hydroxybutyl (meth)acrylate, 4-hydroxybutyl (meth)acrylate, and 2-(meth)acryloyloxyethyl succinic acid.

In addition, specific examples of commercially available products of the component (B) may include HEMA, and the like, manufactured by Nippon Shokubai Co., Ltd., HEA, 4HBA, and the like, manufactured by Osaka Organic Chemical Industry Ltd., HO-MS(N), HOB(N) manufactured by Kyoeisha Chemical Co., Ltd., and the like, but the commercially available products of the component (B) is not limited to thereto.

When the total of the components (A) and (B) is 100 parts by mass, a ratio of the component (A) to the component (B) (parts by mass of the component (A): parts by mass of the component (B)) is preferably 20:80 to 80:20. When the component (A) is more than 20 parts by mass, low temperature curability can be maintained, and when the component (A) is less than 80 parts by mass, viscosity can be lowered, thus resulting in good handleability. In addition, from the viewpoint of further exerting the above-described effect, the ratio of the component (A) to the component (B) is more preferably 40:60 to 60:40.

Further, a monomer having one (meth)acrylic group other than the component (B) can be added to the composition of the present invention to the extent that characteristics (effects) of the present invention are not impaired. Specific examples of the monomer other than the component (B) may include (meth)acrylic acid, lauryl (meth)acrylate, stearyl (meth)acrylate, isononyl (meth)acrylate, ethyl carbitol (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth)acrylate, phenyl (meth)acrylate, phenoxyethyl (meth)acrylate, phenoxydiethylene glycol (meth)acrylate, phenoxy tetraethylene glycol (meth)acrylate, nonylphenoxyethyl (meth)acrylate, nonylphenoxy tetraethylene glycol (meth)acrylate, methoxydiethylene glycol (meth)acrylate, ethoxydiethylene glycol (meth)acrylate, butoxyethyl (meth)acrylate, butoxy triethylene glycol (meth)acrylate, 2-ethylhexyl polyethylene glycol (meth)acrylate, nonylphenyl polypropylene glycol (meth)acrylate, methoxydipropylene glycol (meth)acrylate, glycidyl (meth)acrylate, cyclic trimethylolpropane formal (meth)acrylate, glycerol (meth)acrylate, polyethylene glycol (meth)acrylate, polypropylene glycol (meth)acrylate, epichlorohydrin (hereinafter abbreviated as ECH)-modified butyl (meth)acrylate, ECH-modified phenoxy (meth)acrylate, ethylene oxide (hereinafter abbreviated as EO)-modified phthalic acid (meth)acrylate, EO-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, 2-hydroxyethyl (meth)acrylate acid phosphate, dimethyl acrylamide, acryloylmorpholine, and the like, but the monomer other than the component (B) is not limited thereto.

A monomer having two or more (meth)acrylic groups in a molecule can be added to the composition of the present invention to the extent that the characteristics of the present invention are not impaired. However, in consideration of the exhibition of electroconductivity in the electroconductive adhesive, it is preferable not to add the monomer having two or more (meth)acrylic groups in the molecule to the composition of the present invention.

The component (C) that can be used in the present invention is an organic peroxide having a structure of Formula 1 below. From the viewpoint of further exerting the effect of the present invention (that is, achievement of both storage stability and low temperature curability), the component (C) is more preferably an organic peroxide having a structure of Formula 2 below. In Formula 1, two $R^1$s on the right and left exist as substituents, but each $R^1$ represents an independent hydrocarbon group, and may be the same or different from each other. In Formula 2, two Res on the right and left exist as substituents, but each $R^2$ represents an independent hydrocarbon group, and may be the same or different from each other. Further, $R^1$ and $R^2$ each represent an independent hydrocarbon group, and may be linear or cyclic. $R^1$ and $R^2$ may be the same or different from each other.

In the present invention, by using the component (C), low temperature curability is realized under an atmosphere at 60 to 140° C. In addition, specific examples of the component (C) may include di-n-propyl-peroxydicarbonate, di-iso-propyl-peroxydicarbonate, di(4-t-butylcyclohexyl)peroxydicarbonate (also referred to as "bis(4-t-butylcyclohexyl)peroxydicarbonate"), di(2-ethylhexyl)peroxydicarbonate, di-sec-butyl-peroxydicarbonate, and the like, but the component (C) is not limited thereto.

[Chemical Formula 1]

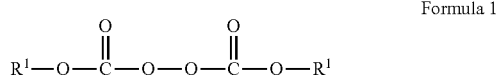

Formula 1

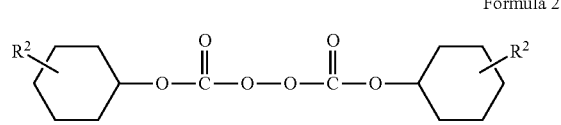

Formula 2

Specific examples of commercially available products of the component (C) may include NPP-50M, IPP-50, IPP-27, TCP, OPP, and SBP as peroyl series manufactured by NOF Corporation, and the like, but the commercially available products of the component (C) are not limited thereto.

In the present invention, an amount of the component (C) is not particularly limited, but it is preferable that the component (C) is included in an amount of 1 to 20 parts by mass, more preferably 5 to 15 parts by mass, and further preferably 6 to 10 parts by mass, with respect to 100 parts by mass in total of the components (A) and (B). When the amount of the component (C) is 1 part by mass or more, the composition is cured at a low temperature, and when the amount is 20 parts by mass or less, storage stability can be maintained.

The composition of the present invention may further include electroconductive particles as a component (D). The composition of the present invention including these electroconductive particles can be suitably used for a thermocurable electroconductive adhesive described below. As the component (D) that can be used in the present invention, electroconductive particles can be included, and in particular, electroconductive particles surface-treated with stearic acid are more preferable. There is no clear reason for this, but electroconductive particles treated with a lubricant (for example, stearic acid, or the like) particularly have an effect of improving storage stability.

Electroconductive particles are sufficient as long as electroconductivity is exhibited, and a material of the particles and a shape of the particles are not limited. Examples of the material of the electroconductive particles may include silver powder, nickel powder, palladium powder, carbon powder, tungsten powder, and plating powder, and the like. Silver powder is particularly preferable. In addition, in consideration of cost and electroconductivity, the electroconductive particles are preferably silver powder and silver-plated powder. Further, from the viewpoint of further exerting the storage stability described above, the component (D) of the present invention is preferably at least one kind of electroconductive particles selected from silver powder and silver-plated powder that are surface-treated with stearic acid.

Further, examples of the shape of the electroconductive particle may include a spherical shape, an amorphous shape, a flake (scale) shape, a filamentous (needle) shape, a dendritic shape, and the like. A plurality of kinds may be mixed and used. In particular, electroconductive particles obtained by silver-plating powders of insulating metal oxide, nickel powder, or an insulator are preferable since raw material costs are low. Specific examples of the insulating metal oxide may include copper powder, aluminum powder, iron powder, or the like, which are metals in which electroconductivity is not exhibited due to passivation on a metal surface.

In order to knead the component (A) or the component (B), the 50% average particle diameter of the electroconductive particles is preferably 100 μm or less, more preferably 50 μm or less, and particularly preferably 10 μm or less.

As a method of surface-treating electroconductive particles with a lubricant such as stearic acid, or the like, there is known a method of treating the lubricant diluted in a solvent together with the electroconductive particles using a ball mill, or the like, and then drying the solvent, and the like, but the method is not limited thereto.

In the present invention, an amount of the component (D) is not particularly limited, but it is preferable that the component (D) is included in an amount of 100 to 1,000 parts by mass, and more preferably 200 to 500 parts by mass, with respect to 100 parts by mass in total of the component (A) and the component (B). When the amount of the component (D) is 100 parts by mass or more, isotropic electroconductivity is exhibited, and when the amount of the component (D) is 1,000 parts by mass or less, being stringy and the like do not occur, and thus there are no problems in workability.

In addition, a stabilizer may be added to the extent that characteristics of the present invention are not impaired. The stabilizer includes a polymerization inhibitor, a chelating agent, and the like. The polymerization inhibitor can also be used to capture occurring radical species to maintain storage stability. In addition, a chelating agent can be used to capture occurring metal ions.

Specific examples of the polymerization inhibitor may include quinone-based polymerization inhibitors such as hydroquinone, methoxyhydroquinone, benzoquinone, p-tert-butylcatechol, and the like, alkylphenol-based polymerization inhibitors such as 2,6-di-tert-butylphenol, 2,4-di-tert-butylphenol, 2-tert-butyl-4,6-dimethylphenol, 2,6-di-tert-butyl-4-methylphenol (BHT), 2,4,6-tri-tert-butylphenol, and the like, amine-based polymerization inhibitors such as alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, and the like, N-oxyl-based polymerization inhibitors such as 2,2,6,6-tetramethylpiperidine-N-oxyl, 4-hydroxy-2,2,6,6-tetramehtylpiperidine-N-oxyl, 4-benzoyloxy-2,2,6,6-tetramethylpiperidine-N-oxyl, and the like, but the polymerization inhibitor is not limited thereto.

Specific examples of the chelating agent may include EDTA.2Na and EDTA-4Na (also referred to as "4NA"; ethylenediamine-N,N,N',N'-tetraacetic acid tetrasodium salt tetrahydrate) manufactured by Dojindo Laboratories, and the like. Further, examples of the chelating agent in a liquid form at 25° C. may include MZ-8 manufactured by Chelest Corporation, but the chelating agent is not limited thereto.

When the stabilizer is added in an excessive amount, the storage stability is improved whereas the reactivity is slow, and thus the stabilizer is preferably included in an amount of 0.001 to 1.0% by mass with respect to the total of the composition.

Further, a filler can be added as a component other than the component (D) to the extent that characteristics of the present invention are not impaired. The filler is classified into an inorganic filler or an organic filler. Examples of the inorganic filler may include a metal powder in which electroconductivity is not exhibited (a metal powder of which a surface forms passivation by oxidation), alumina powder, calcium carbonate powder, talc powder, silica powder, fumed silica powder, and the like, and examples of the organic filler may include acrylic particles, rubber particles, styrene particles, and the like, but the filler is not limited thereto. By adding the filler, it is possible to control viscosity or thixotropy, while simultaneously improving strength. Powder characteristics such as an average particle diameter, shape, and the like, are not particularly limited, but in consideration of ease of dispersion into the composition and nozzle clogging, the 50% average particle diameter is preferably 0.001 to 50 μm. In particular, by adding fumed silica powder, thixotropy is imparted, and simultaneously, the storage stability is maintained. Specific examples of the fumed silica powder may include, AEROSIL R805, AEROSIL R972 manufactured by Nippon Aerosil Co., Ltd., and the like, but the fumed silica powder is not limited thereto.

The average particle diameter is generally measured by a laser particle size analyzer or SEM, but is not limited thereto.

It is preferable that 0.1 to 10 parts by mass of a filler other than the component (D) is added with respect to 100 parts by mass in total of the components (A) and (B). When an amount of the filler other than the component (D) is 0.1 parts by mass or more, fluidity can be stabilized, and simultaneously, workability can be improved, and when the amount of the filler is 10 parts by mass or less, the storage stability can be maintained.

To the composition of the present invention, additives such as a coloring agent such as a pigment and a dye, a flame retardant, an antioxidant, a defoaming agent, a silane-based coupling agent, a titanium-based coupling agent, an aluminum-based coupling agent, a leveling agent, a rheology control agent, and the like, may be blended each in an appropriate amount to the extent that the characteristics of the present invention are not impaired. By these additions, it is possible to obtain a composition or a cured product thereof in which electroconductivity, resin strength, adhesive strength, workability, storage stability, and the like, are excellent. Meanwhile, in the field of an anisotropic electroconductive adhesive, rubber, an elastomer, and a thermoplastic resin are dissolved (compatible) with a monomer, a solvent, or the like, and used as a film forming agent. However, it is preferable that the rubber, the elastomer and the thermoplastic resin are not included in the (meth)acrylic resin composition of the present invention since workability such as being stringy, and the like, are hindered due to increased viscosity when the rubber, the elastomer, and the thermoplastic resin are used. Here, the rubber is not particularly limited, and examples of the rubber may include natural rubber; and synthetic rubbers such as isoprene rubber, butadiene rubber, styrene-butadiene rubber, chloroprene rubber, nitrile rubber, polyisobutylene (butyl rubber), ethylene propylene rubber, chlorosulfonated polyethylene, acrylic rubber, fluorine rubber, epichlorohydrin rubber, urethane rubber, silicone rubber, and the like. The elastomer is not particularly limited, and examples of the elastomer may include, for example, (thermoplastic) elastomers such as a styrene-based elastomer, an olefin/alkene-based elastomer, a vinyl chloride-based elastomer, a urethane-based elastomer, an amide-based elastomer, and the like. The thermoplastic resin is not particularly limited, and examples of the thermoplastic resin may include, for example, polyalkylene such as polyethylene, high density polyethylene, medium density polyethylene, low density polyethylene, polypropylene, or the like, polyester such as polyvinyl chloride, polyvinylidene chloride, polystyrene, polyvinyl acetate, polyurethane, polytetrafluoroethylene, ABS resin (acrylonitrile butadiene styrene resin), AS resin, acrylic resin, polyamide, polyacetal, polycarbonate, modified polyphenylene ether, polyethylene terephthalate, glass fiber-reinforced polyethylene terephthalate, polybutylene terephthalate, or the like, cyclic polyolefin, polyphenylene sulfide, polytetrafluoroethylene, polysulfone, polyethersulfone, amorphous polyarylate, liquid crystal polymer, polyether ether ketone, thermoplastic polyimide, polyamide imide, and the like.

EXAMPLE

Hereinafter, the present invention is described in more detail with reference to the following Examples, but the technical scope of the present invention is not limited to these Examples only.

Examples 1 to 9 and Comparative Examples 1 to 19

The following components were prepared for preparing a (meth)acrylic resin composition or a electroconductive adhesive. Hereinafter, the (meth)acrylic resin composition or electroconductive adhesive is simply referred to as "composition".

Component (A): Urethane Modified Oligomer Having a (Meth)Acrylic Group

Aromatic urethane acrylate having 6 functional groups (acrylic groups) in the molecule (Ebecryl 220 manufactured by DAICEL-ALLNEX LTD.)

Component (B): Monomer having a hydroxyl group and/or a carboxylic group and one (meth)acrylic group in the molecule in which a surface tension is 25 to 45 mN/m 2-Hydroxyethyl methacrylate (HEMA manufactured by Nippon Shokubai Co., Ltd.)
4-Hydroxybutyl acrylate (4HBA manufactured by Osaka Organic Chemical Industry Ltd.)
2-Hydroxyethylacrylate (HEA manufactured by Osaka Organic Chemical Industry Ltd.)
2-Methacryloyloxyethyl succinic acid (HO-MS(N) Kyoeisha Chemical Co., Ltd.)
2-Hydroxypropyl methacrylate (HOB(N) manufactured by Kyoeisha Chemical Co., Ltd.)

Component (B'): Monomer Having One (Meth)Acrylic Group Other Than Component (B)

Isononyl acrylate (INAA manufactured by Osaka Organic Chemical Industry Ltd.)
Isobornyl methacrylate (IBX manufactured by Osaka Organic Chemical Industry Ltd.)
Dicyclopentanyl methacrylate (FANCRYL FA-513M manufactured by Hitachi Chemical Company, Ltd.)
Cyclic trimethylolpropane formal acrylate (Viscoat #200 manufactured by Osaka Organic Chemical Industry Ltd.)
Tetrahydrofurfuryl acrylate (THFA manufactured by Osaka Organic Chemical Industry Ltd.)
Isobornyl acrylate (IBXA manufactured by Osaka Organic Chemical Industry Ltd.)
Dimethylacrylamide (DMAA manufactured by KJ Chemicals Corporation)
Phenoxyethyl acrylate (Viscoat #192 manufactured by Osaka Organic Chemical Industry Ltd.)
Acryloyl morpholine (ACMO manufactured by KJ Chemicals Corporation)

Component (C): Organic Peroxide Having the Structure of Formula 1

Bis(4-t-butylcyclohexyl)peroxydicarbonate (solid at 25° C.) (Peroyl TCP manufactured by NOF Corporation)

Component (D): Electroconductive Particles

Silver powder 1: Flake shaped silver powder surface-treated with stearic acid having the following powder properties
Tap density: 3.17 g/cm$^3$
50% average particle diameter: 5.0 μm (laser particle size analyzer)
BET specific surface area: 0.67 m$^2$/g
Silver powder 2: Flake shaped silver powder surface-treated with stearic acid having the following powder properties Tap density: 3.57 g/cm$^3$
50% average particle diameter: 1.2 μm (laser particle size analyzer)
BET specific surface area: 2.01 m$^2$/g
Other components: Stabilizer
2,6-di-t-butyl-4-methylphenol (BHT) (reagent)
Ethylenediamine-N,N,N',N'-tetraacetic acid tetrasodium salt tetrahydrate (solid at 25° C.) (4NA (EDTA.4Na), manufactured by Dojindo Laboratories)

Surface Tension Measurement (Plate Method)

The surface tension of the component (B) and the component (B') was measured. As a measurement method, surface tension was measured using an automatic surface tensiometer YD-200 manufactured by Kyowa Interface Science Co., Ltd., in an environment of 25° C. When a probe is touched on a surface of a liquid, the liquid is wetted up against the probe, and at this time, since surface tension acts along the periphery of the probe to draw the probe into the liquid. This drawing force is read and defined as "surface tension (mN/m)". A platinum plate was used as the probe. Results thereof are summarized in Table 1 and Table 3.

Component (A), Component (B) (or Component (B')), and other components were weighed, put into a stirring pot, and stirred for 1 hour. After that, the component (C) was weighed, put into a stirring pot, and stirred for 1 hour to prepare respective (meth)acrylic resin compositions of Examples and Comparative Examples. Detailed preparation amounts are as shown in Table 1, and numerical values are all expressed in parts by mass.

TABLE 1

| Component | Raw material | Surface tension | Example 1 | Example 2 | Example 3 | Example 4 | Example 5 | Comparative Example 1 | Comparative Example 2 |
|---|---|---|---|---|---|---|---|---|---|
| Component (A) | Ebecryl 220 | — | 40.0 | 40.0 | 40.0 | 40.0 | 40.0 | 40.0 | 40.0 |
| Component (B) | HOB(N) | 30.8 | 60.0 | | | | | | |
| | HEMA | 35.0 | | 60.0 | | | | | |
| | 4HBA | 36.6 | | | 60.0 | | | | |
| | HEA | 37.8 | | | | 60.0 | | | |
| | HO-MS(N) | 40.3 | | | | | 60.0 | | |
| Component (B') | INAA | 27.3 | | | | | | 60.0 | |
| | IBX | 30.0 | | | | | | | 60.0 |
| | FA-513M | 34.0 | | | | | | | |
| | #200 | 34.9 | | | | | | | |
| | THFA | 35.0 | | | | | | | |
| | IBXA | 35.1 | | | | | | | |
| | DMAA | 36.8 | | | | | | | |
| | Viscoat 192 | 34.9 | | | | | | | |
| | ACMO | 43.8 | | | | | | | |
| Component (C) | Peroyl TCP | — | 7.0 | 7.0 | 7.0 | 7.0 | 7.0 | 7.0 | 7.0 |
| Other components | BHT | — | 0.10 | 0.10 | 0.10 | 0.10 | 0.10 | 0.10 | 0.10 |
| | 4NA | — | 0.10 | 0.10 | 0.10 | 0.10 | 0.10 | 0.10 | 0.10 |
| | Total | | 107.2 | 107.2 | 107.2 | 107.2 | 107.2 | 107.2 | 107.2 |

| Component | Raw material | Surface tension | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Component (A) | Ebecryl 220 | — | 40.0 | 40.0 | 40.0 | 40.0 | 40.0 | 40.0 | 40.0 |
| Component (B) | HOB(N) | 30.8 | | | | | | | |
| | HEMA | 35.0 | | | | | | | |
| | 4HBA | 36.6 | | | | | | | |
| | HEA | 37.8 | | | | | | | |
| | HO-MS(N) | 40.3 | | | | | | | |
| Component (B') | INAA | 27.3 | | | | | | | |
| | IBX | 30.0 | | | | | | | |
| | FA-513M | 34.0 | 60.0 | | | | | | |
| | #200 | 34.9 | | 60.0 | | | | | |
| | THFA | 35.0 | | | 60.0 | | | | |
| | IBXA | 35.1 | | | | 60.0 | | | |
| | DMAA | 36.8 | | | | | 60.0 | | |
| | Viscoat 192 | 34.9 | | | | | | 60.0 | |
| | ACMO | 43.8 | | | | | | | 60.0 |
| Component (C) | Peroyl TCP | — | 7.0 | 7.0 | 7.0 | 7.0 | 7.0 | 7.0 | 7.0 |
| Other components | BHT | — | 0.10 | 0.10 | 0.10 | 0.10 | 0.10 | 0.10 | 0.10 |
| | 4NA | — | 0.10 | 0.10 | 0.10 | 0.10 | 0.10 | 0.10 | 0.10 |
| | Total | | 107.2 | 107.2 | 107.2 | 107.2 | 107.2 | 107.2 | 107.2 |

Note)
Blank indicates that related components are not blended.

The storage stability and the curability for Examples 1 to 5 and Comparative Examples 1 to 9 were confirmed. Results thereof are summarized in Table 2.

Confirmation of Storage Stability

After stirring the respective compositions of Examples and Comparative Examples with a rod made of polytetrafluoroethylene, 2.0 cc of each of the compositions was weighed and the viscosity was measured using Brookfield (model number: DV-2+Pro) in a state in which temperature was set at 25° C. with a temperature controller. As measurement conditions, CPE-41 (3°×R2.4) was used for a cone rotor, and the rotation speed was 10 rpm. The viscosity after 3 minutes is defined as "initial viscosity (Pa·s)". Thereafter, a container containing the composition and having no air permeability was stored in an atmosphere at 25° C. The viscosity was measured every 24 hours from the start of storage and the viscosity was measured in the same manner as the measurement of the initial viscosity. It was determined that stability was lost at the time when the viscosity increased to a value twice as or higher than the initial viscosity, and thus the time before the viscosity reached to the value twice as or higher than the initial viscosity was defined as "storage stability (time)". If the viscosity already reached to the value twice as or higher than the initial viscosity in the first 24 hours, the time was described as "less than 24". In consideration of the change in viscosity at the time of operation, it is preferable to maintain the storage stability of 100 hours or more.

Confirmation of Curability

A masking tape (50 μm of thickness) was attached to a glass plate having a length of 100 mm, a width of 50 mm, and a thickness of 2.0 mm so as to have a length of 100 mm and a width of 10 mm, and the composition was squeezed to form a uniform coating film to manufacture a test piece (for one test piece, n=2). Each test piece was put in a hot air drying oven in an atmosphere at 80° C., left to stand for 10, 20, 30 and 40 minutes, and then removed from the hot air drying oven. After the temperature of the test piece decreased to 25° C., the time for which the cured material was not deformed by touching a surface of the cured product with the rod made of polytetrafluoroethylene was evaluated as "curability". In order to maintain low temperature curing, it is preferable to perform curing for less than 30 minutes.

TABLE 2

| Test items | Example 1 | Example 2 | Example 3 | Example 4 | Example 5 | Comparative Example 1 | Comparative Example 2 |
|---|---|---|---|---|---|---|---|
| Storage stability | 240 | 600 | 600 | 600 | 312 | 72 | 96 |
| Curability | 20 | 20 | 20 | 20 | 20 | 20 | 20 |

| Test items | Comparative Example 3 | Comparative Example 4 | Comparative Example 5 | Comparative Example 6 | Comparative Example 7 | Comparative Example 8 | Comparative Example 9 |
|---|---|---|---|---|---|---|---|
| Storage stability | 96 | 72 | 72 | 48 | Less than 24 | 72 | Less than 24 |
| Curability | 20 | 20 | 20 | 20 | 20 | 20 | 20 |

When comparing Examples 1 to 5 with Comparative Examples 1 to 9, in Examples using the component (B) having a hydroxyl group and/or a carboxylic group and a (meth)acrylic group in the molecule and simultaneously having a surface tension of 25 to 45 mN/m, the storage stability exceeded 100 hours while maintaining the curability. In particular, in Examples 2 to 4, the storage stability reached over 600 hours, exceeding 500 hours. On the other hand, when the component (B) of the present invention was not used, the storage stability did not exceed 100 hours (see Comparative Examples 1 to 9), and in particular, the storage stability was less than 24 hours in Comparative Example 7 or 9.

Component (A), Component (B), and other components were weighed and put into the stirring pot. After stirring for 30 minutes, the component (D) was weighed into the stirring pot, and the mixture was further stirred for another 30 minutes while degassing. Finally, the component (C) was weighed, put into the stirring pot, and stirred for 1 hour to prepare respective electroconductive adhesives of Examples and Comparative Examples. Detailed preparation amounts are as shown in Table 3, and numerical values are all expressed in parts by mass.

TABLE 3

| Component | Raw material | Surface tension | Example 6 | Example 7 | Example 8 | Example 9 | Comparative Example 10 | Comparative Example 11 | Comparative Example 12 |
|---|---|---|---|---|---|---|---|---|---|
| Component (A) | Ebecryl 220 | — | 40.0 | 40.0 | 40.0 | 40.0 | 40.0 | 40.0 | 40.0 |

TABLE 3-continued

| Component | Raw material | Surface tension | Example 6 | Example 7 | Example 8 | Example 9 | Comparative Example 10 | Comparative Example 11 | Comparative Example 12 |
|---|---|---|---|---|---|---|---|---|---|
| Component (B) | HEMA | 35.0 | 60.0 | | | | | | |
| | 4HBA | 36.6 | | 60.0 | | | | | |
| | HEA | 37.8 | | | 60.0 | | | | |
| | HOMS(N) | 40.3 | | | | 60.0 | | | |
| Component (B') | HOB(N) | 30.8 | | | | | 60.0 | | |
| | INAA | 27.3 | | | | | | 60.0 | |
| | IBX | 30.0 | | | | | | | 60.0 |
| | FA-513M | 34.0 | | | | | | | |
| | #200 | 34.9 | | | | | | | |
| | THFA | 35.0 | | | | | | | |
| | IBXA | 35.1 | | | | | | | |
| | DMAA | 36.8 | | | | | | | |
| | Viscoat 192 | 34.9 | | | | | | | |
| | ACMO | 43.8 | | | | | | | |
| Component (C) | Peroyl TCP | — | 7.0 | 7.0 | 7.0 | 7.0 | 7.0 | 7.0 | 7.0 |
| Component (D) | Silver powder 1 | — | 250.0 | 250.0 | 250.0 | 250.0 | 250.0 | 250.0 | 250.0 |
| | Silver powder 2 | — | 70.0 | 70.0 | 70.0 | 70.0 | 70.0 | 70.0 | 70.0 |
| Other components | BHT | — | 0.10 | 0.10 | 0.10 | 0.10 | 0.10 | 0.10 | 0.10 |
| | 4NA | — | 0.10 | 0.10 | 0.10 | 0.10 | 0.10 | 0.10 | 0.10 |
| | Total | | 427.2 | 427.2 | 427.2 | 427.2 | 427.2 | 427.2 | 427.2 |

| Component | Raw material | Surface tension | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|---|
| Component (A) | Ebecryl 220 | — | 40.0 | 40.0 | 40.0 | 40.0 | 40.0 | 40.0 | 40.0 |
| Component (B) | HEMA | 35.0 | | | | | | | |
| | 4HBA | 36.6 | | | | | | | |
| | HEA | 37.8 | | | | | | | |
| | HOMS(N) | 40.3 | | | | | | | |
| Component (B') | HOB(N) | 30.8 | | | | | | | |
| | INAA | 27.3 | | | | | | | |
| | IBX | 30.0 | | | | | | | |
| | FA-513M | 34.0 | 60.0 | | | | | | |
| | #200 | 34.9 | | 60.0 | | | | | |
| | THFA | 35.0 | | | 60.0 | | | | |
| | IBXA | 35.1 | | | | 60.0 | | | |
| | DMAA | 36.8 | | | | | 60.0 | | |
| | Viscoat 192 | 34.9 | | | | | | 60.0 | |
| | ACMO | 43.8 | | | | | | | 60.0 |
| Component (C) | Peroyl TCP | — | 7.0 | 7.0 | 7.0 | 7.0 | 7.0 | 7.0 | 7.0 |
| Component (D) | Silver powder 1 | — | 250.0 | 250.0 | 250.0 | 250.0 | 250.0 | 250.0 | 250.0 |
| | Silver powder 2 | — | 70.0 | 70.0 | 70.0 | 70.0 | 70.0 | 70.0 | 70.0 |
| Other components | BHT | — | 0.10 | 0.10 | 0.10 | 0.10 | 0.10 | 0.10 | 0.10 |
| | 4NA | — | 0.10 | 0.10 | 0.10 | 0.10 | 0.10 | 0.10 | 0.10 |
| | Total | | 427.2 | 427.2 | 427.2 | 427.2 | 427.2 | 427.2 | 427.2 |

Note)
Blank indicates that related components are not blended.

The storage stability and curability for Examples 6 to 9 and Comparative Examples 10 to 19 were confirmed in the same manner as described above, and volume resistivity was further measured according to the method described below. Results thereof are summarized in Table 3.

Measurement of Volume Resistivity

A masking tape (50 μm of thickness) was attached to a glass plate having a thickness of 2.0 mm, a width of 50 mm, and a length of 100 mm so as to have a length of 100 mm and a width of 10 mm, and the composition was squeezed to form a uniform coating film to manufacture a test piece (n=2). Each test piece was put in a hot air drying oven under an atmosphere at 80° C., left to stand for 60 minutes, and then removed from the hot air drying oven. After the temperature of the test piece decreased to 25° C., "resistance value (Q)" was measured using a dual display multimeter attached with plate-like electrodes in a state in which a distance between the electrodes was 50 mm. The volume resistivity was calculated from (resistance value)×(width of the cured product×thickness (sectional area) of the cured product)/(distance between the electrodes) and defined as "electroconductivity ($\times 10^{-6}$ Ω·m)". From the viewpoint of securing electroconductivity, the electroconductivity is preferably $10.0 \times 10^{-6}$ Ω·m or less.

TABLE 4

| Test items | Example 6 | Example 7 | Example 8 | Example 9 | Comparative Example 10 | Comparative Example 11 | Comparative Example 12 |
|---|---|---|---|---|---|---|---|
| Storage stability | 144 | 144 | 120 | 192 | 48 | 48 | 48 |
| Curability | 20 | 20 | 20 | 20 | 20 | 20 | 20 |
| Electroconductivity | 3.1 | 3.5 | 3.1 | 2.9 | 5.4 | 5.5 | 3.2 |

| Components | Comparative Example 13 | Comparative Example 14 | Comparative Example 15 | Comparative Example 16 | Comparative Example 17 | Comparative Example 18 | Comparative Example 19 |
|---|---|---|---|---|---|---|---|
| Storage stability | 48 | 48 | 48 | 48 | Less than 24 | 72 | Less than 24 |
| Curability | 20 | 20 | 20 | 20 | 20 | 20 | 10 |
| Electroconductivity | 5.0 | 5.1 | 4.8 | 5.1 | 5.5 | 5.4 | 5.3 |

As can be seen from respective Examples above, when the component (D) was further added to the composition including the components (A) to (C) as essential components, the initial viscosity as the composition increased, and simultaneously, the composition was easily thickened when stored at 25° C. Even in this state, when comparing Examples 6 to 9 with Comparative Examples 10 to 19, the curability was the same as each other, but in Examples, the electroconductivity was better and the storage stability exceeded 100 hours by using the component (B) having a hydroxyl group and/or a carboxylic group and one (meth)acrylic group in the molecule and simultaneously having the surface tension of 33 to 45 mN/m used in Examples. On the other hand, in Comparative Examples, the storage stability did not exceed 100 hours, and particularly, in Comparative Examples 17 and 19, the storage stability was less than 24 hours.

INDUSTRIAL APPLICABILITY

When the (meth)acrylic resin composition of the present invention is stored by using a sealed container, it is possible to achieve both storage stability in an atmosphere at 25° C. and low temperature curability in an atmosphere at 60 to 140° C., and further, properties thereof (that is, achievement of both storage stability and low temperature curability) can be exhibited even in a electroconductive adhesive including electroconductive particles. Accordingly, a discharge amount is not changed during a discharge operation for a long time, and if the composition can be cured at a low temperature, damage to the adherend due to heating can be reduced. From these properties, the composition can be used for assembling various electronic components, and the like, which has a possibility of being developed for wide use.

The present application is based on Japanese Patent Application No. 2016-172136, filed on Sep. 2, 2016, the entire contents of which is incorporated herein for all purposes by this reference.

The invention claimed is:

1. A (meth)acrylic resin composition consisting of:
    component (A): a urethane modified oligomer having a (meth)acrylic group,
    component (B): a monomer having a hydroxyl group and/or a carboxylic group and one (meth)acrylic group in a molecule in which a surface tension is 25 to 45 mN/m,
    component (C): an organic peroxide having the following structure:

[Chemical Formula 1]

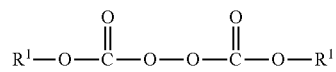

wherein each $R^1$ represents an independent hydrocarbon group,
   component (D): electroconductive particles,
   a polymerization inhibitor; and
   a chelating agent,
   wherein the composition includes 100 to 1,000 parts by mass of the component (D) with respect to 100 parts by mass in total of the component (A) and the component (B),
   wherein the component (D) is at least one kind of electroconductive particles selected from silver powder and silver-plated powder that are surface-treated with stearic acid,
   wherein with respect to 100 parts by mass in total of the component (A) and the component (B), a ratio of parts by mass of the component (A) and parts by mass of the component (B) ranges from 20:80 to 80:20, and
   wherein the polymerization inhibitor is at least one kind selected from the group consisting of hydroquinone, methoxyhydroquinone, benzoquinone, p-tert-butylcatechol, 2,6-di-tert-butylphenol, 2,4-di-tert-butylphenol, 2-tert-butyl-4,6-dimethylphenol, 2,6-di-tert-butyl-4-methylphenol (BHT), 2,4,6-tri-tert-butylphenol, alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, 2,2,6,6-tetramethylpiperidine-N-oxyl, 4-hydroxy-2,2,6,6-tetramethylpiperidine-N-oxyl, 4-benzoyloxy-2,2,6,6-tetramethylpiperidine-N-oxyl.

2. The (meth)acrylic resin composition according to claim 1, wherein the component (B) has a surface tension of 33 to 45 mN/m.

3. The (meth)acrylic resin composition according to claim 1, wherein the component (C) is an organic peroxide having the following structure:

[Chemical Formula 2]

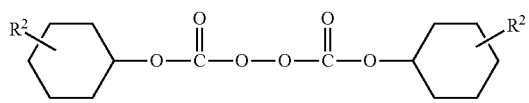

wherein each R² represents an independent hydrocarbon group.

4. The (meth)acrylic resin composition according to claim 1, wherein the component (B) is at least one kind selected from the group consisting of 2-hydroxyethyl (meth)acrylate, 2-hydroxybutyl (meth)acrylate, 4-hydroxybutyl (meth)acrylate, and 2-(meth)acryloyloxyethyl succinic acid.

5. A thermocurable electroconductive adhesive comprising: the (meth)acrylic resin according to claim 1.

6. The (meth)acrylic resin composition according to claim 1, wherein the chelating agent is ethylenediamine-N,N,N',N'-tetraacetic acid tetrasodium salt tetrahydrate.

7. A (meth)acrylic resin composition consisting of:
component (A): a urethane modified oligomer having a (meth)acrylic group,
component (B): a monomer having a hydroxyl group and/or a carboxylic group and one (meth)acrylic group in a molecule in which a surface tension is 25 to 45 mN/m,
component (C): an organic peroxide having the following structure:

[Chemical Formula 1]

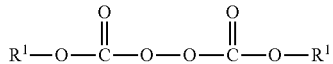

wherein each R¹ represents an independent hydrocarbon group,
component (D): electroconductive particles,
a polymerization inhibitor,
a chelating agent, and
a filler other than the component (D),
wherein the composition includes 100 to 1,000 parts by mass of the component (D) with respect to 100 parts by mass in total of the component (A) and the component (B),
wherein the component (D) is at least one kind of electroconductive particles selected from silver powder and silver-plated powder that are surface-treated with stearic acid,
wherein with respect to 100 parts by mass in total of the component (A) and the component (B), a ratio of parts by mass of the component (A) and parts by mass of the component (B) ranges from 20:80 to 80:20, and
wherein the polymerization inhibitor is at least one kind selected from the group consisting of hydroquinone, methoxyhydroquinone, benzoquinone, p-tert-butylcatechol, 2,6-di-tert-butylphenol, 2,4-di-tert-butylphenol, 2-tert-butyl-4,6-dimethylphenol, 2,6-di-tert-butyl-4-methylphenol (BHT), 2,4,6-tri-tert-butylphenol, alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, 1-hydroxy-4-benzoyloxy-2,2,6,6-tetramethylpiperidine, 2,2,6,6-tetramethylpiperidine-N-oxyl, 4-hydroxy-2,2,6,6-tetramethylpiperidine-N-oxyl, 4-benzoyloxy-2,2,6,6-tetramethylpiperidine-N-oxyl.

8. The (meth)acrylic resin composition according to claim 7, wherein the filler other than the component (D) is at least one kind selected from the group consisting of a metal powder in which electroconductivity is not exhibited, alumina powder, calcium carbonate powder, talc powder, silica powder, and fumed silica powder.

* * * * *